G. F. GRIFFITH.
WIRE STRETCHER.
APPLICATION FILED MAR. 16, 1912.
1,056,169.
Patented Mar. 18, 1913.
2 SHEETS—SHEET 2.
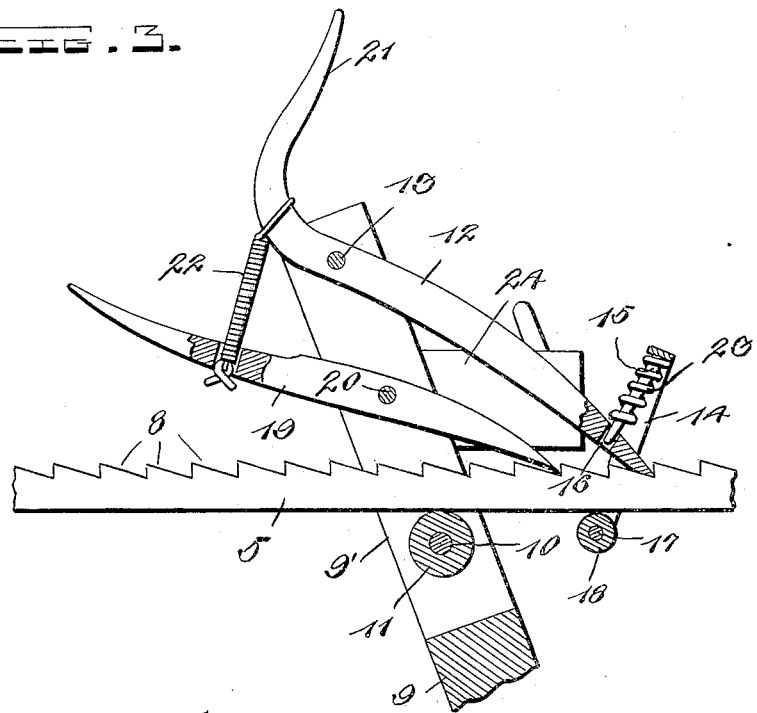
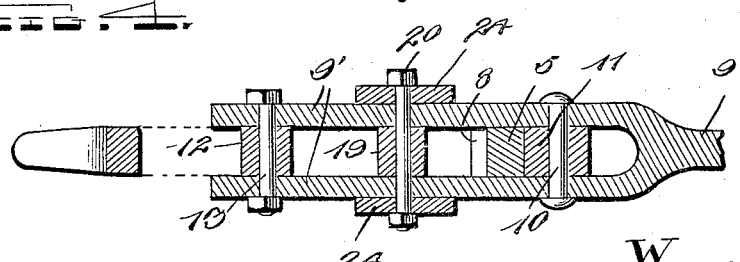
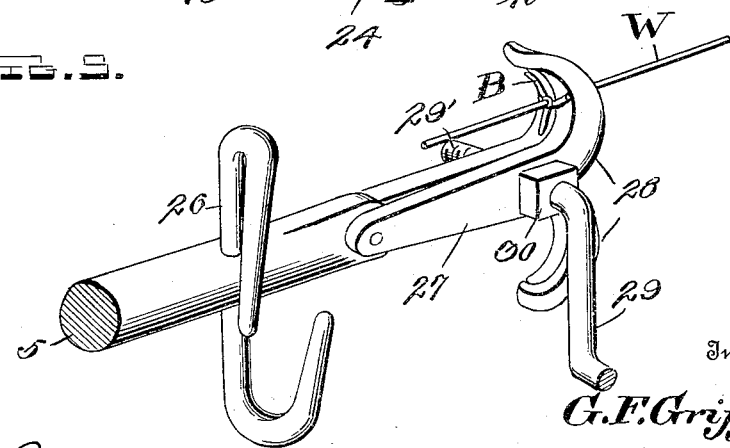
Witnesses
Chas. L. Griesbauer.
G. B. Norton.
Inventor
G. F. Griffith,
By Watson E. Coleman.
Attorney

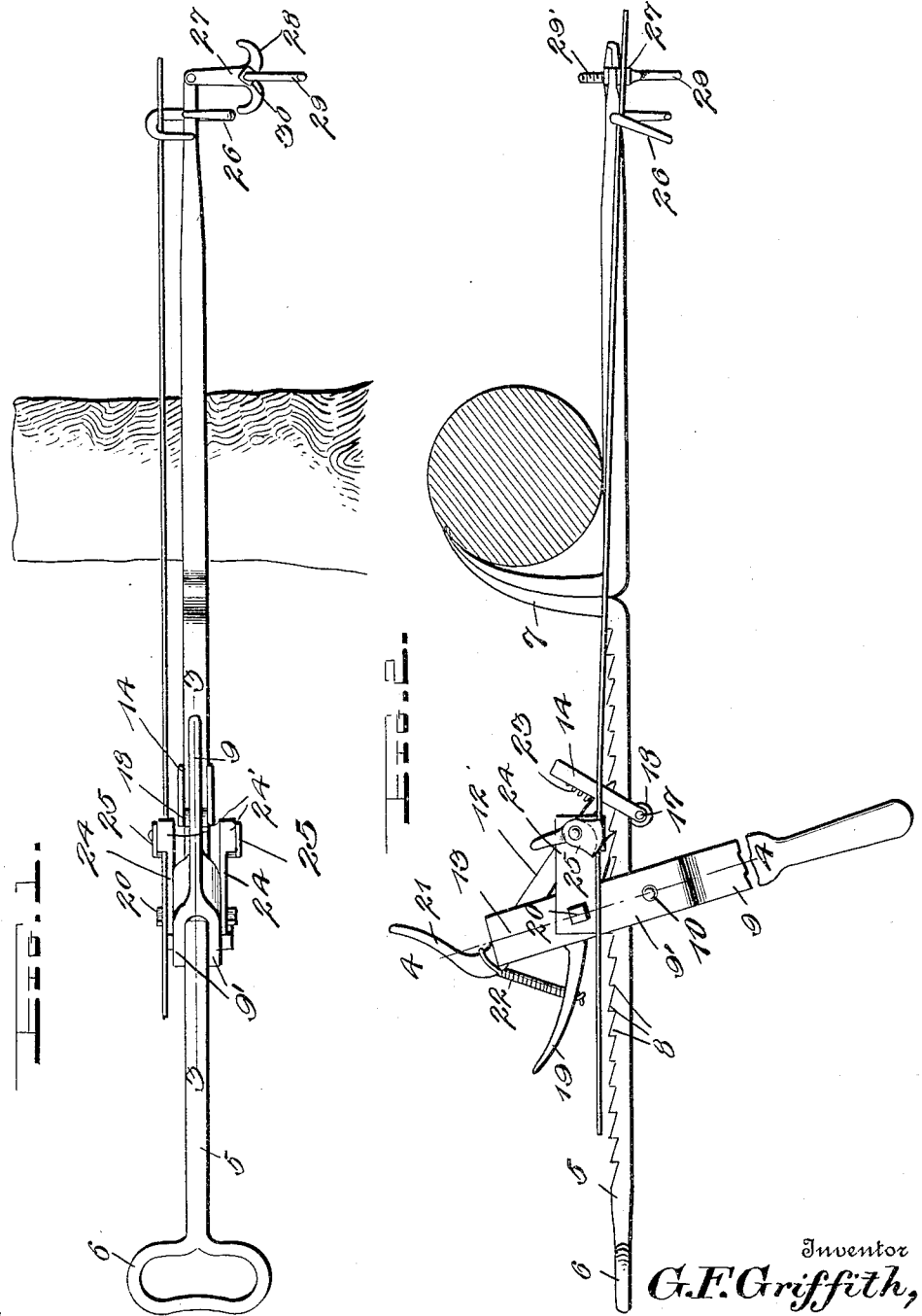

UNITED STATES PATENT OFFICE.

GEORGE F. GRIFFITH, OF JOHNSTOWN, COLORADO.

WIRE-STRETCHER.

1,056,169.  Specification of Letters Patent.  Patented Mar. 18, 1913.

Application filed March 16, 1912. Serial No. 684,279.

*To all whom it may concern:*

Be it known that I, GEORGE F. GRIFFITH, a citizen of the United States, residing at Johnstown, in the county of Weld and State of Colorado, have invented certain new and useful Improvements in Wire-Stretchers, of which the following is a specification, reference being had to the accompanying drawings.

This invention relates to fence wire stretchers and has for its object to provide an implement for this purpose wherein comparatively few parts are employed and whereby the operator may stretch the wires past the post to which they are to be attached and render the same perfectly taut before stapling the wires to the post.

Another object of the invention resides in the provision of a wire stretcher which may be easily and quickly arranged in position upon a tree, post, the side of a building or other stationary object and consists essentially of a body bar and a lever mounted thereon for longitudinal movement, said lever carrying means for the attachment of the fence wires thereto, and means on the end of the body bar to temporarily engage and hold the wires after receiving the first preliminary stretching so that they can be released from connection to the lever and the lever repositioned upon the body bar whereby the stretching operation can be continued.

Another object of the invention is to provide a wire stretcher of the above character which is strong and durable in construction, highly serviceable and efficient in practical operation and may be produced at comparatively small cost.

With the above and other objects in view, the invention consists of the novel features of construction, combination and arrangement of parts hereinafter fully described and claimed, and illustrated in the accompanying drawings, in which—

Figure 1 is a side elevation of a wire stretcher embodying the present invention showing the same positioned upon a tree or post and in actual use; Fig. 2 is a top plan view of the stretcher; Fig. 3 is an enlarged section taken on the line 3—3 of Fig. 1; Fig. 4 is a section taken on the line 4—4 of Fig. 2; and Fig. 5 is a detail perspective view of the wire holding device mounted upon the end of the body bar.

Referring in detail to the drawing 5 designates the body bar of the stretcher which is generally of rectangular form in cross section and is provided at one end with a hand loop 6. This body bar is further provided at a point intermediate of its ends with a laterally projecting hook or spur 7 which is adapted for engagement with a post, tree or other stationary object.

The body bar 5 between the handle loop 6 and the anchoring hook 7 is provided upon one of its faces with rack teeth 8 and upon this portion of the body bar the operating lever 9 is mounted for longitudinal movement. This lever is provided at one end with the fork 9′, the parallel arms of which project upon opposite sides of the body bar. A bolt 10 connects these spaced arms of the lever and upon said bolt an anti-friction roller 11 is loosely mounted for engagement with the body bar. Between the ends of the arms 9′ of the lever a pawl 12 is pivotally mounted upon a bolt 13 which connects said arms. This pawl extends from the operating lever toward the hook or spur 7 on the body bar and moves upon the racked face of said bar at its extremity. A yoke 14 embraces the end of said pawl and the body bar and the intermediate portion thereof is provided with a rigid pin 15 which extends between the arms of the yoke and is loosely mounted at its end in an opening 16 provided in the rack engaging end of the pawl 12. The ends of the arms of the yoke 14 are connected by the bolt 17 and upon this bolt a roller 18 is loosely mounted for engagement with the face of the body bar opposite to the toothed face thereof.

In the forked end of the operating lever a second pawl 19 is pivotally mounted upon the transverse bolt 20, the fulcrum of said latter pawl being disposed inwardly of the fulcrum 13 of the pawl 12 and nearer to the body bar. One end of the pawl 12 is bent to provide a handle 21 to which one end of a coiled spring 22 is connected, the other end of said spring being connected to the pawl 19 and acting to hold the opposite end of said pawl in engagement with the rack teeth 8 on the body bar. A coiled spring 23 is also arranged upon the pin 15 carried by the yoke 14 and bears against the end of the pawl 12 to yieldingly retain the same in engagement with the rack teeth.

Upon opposite ends of the pivot bolt 20 of the pawl 19 a plate 24 is loosely engaged, and upon these plates the cam clamping members 25 are pivotally mounted, the cam surfaces of said member being adapted to co-act with the flanges 24' of the plates to securely clamp the fence wire to said plate.

The body bar 5 at its outer or forward end is reduced and cylindrically formed. To this reduced end of the body bar an open ring or loop 26 is secured to provide a guide for the wire. This loop extends upon one side of the body bar and opposite to the side of the post with which the fence wire engages and to which the same is to be stapled, said loop thus serving to counteract the tendency of the body bar to move laterally as the wire is tightened. To the extreme end of the body bar the wire holding members 27 are pivotally connected. Each of these members is provided at its free end with oppositely extending hooks 28 and through one of said members the threaded shank 29' formed on the end of a crank 29 is loosely disposed, said shank having threaded engagement in the other of said members. A shoulder 30 is also formed on this crank with which one of the holding members engages. It will be observed that the extremities of the hooks 28 upon one of the members 27 are bent inwardly. These inwardly bent ends of the hooks prevent a wire held between the hooks of said members from moving outwardly with respect thereto. In the use of this portion of the invention as shown in Fig. 5, the partially tightened wire indicated at W is disposed between the opposed hooked portions on one side of the members 28, one of the barbs B on the wire engaging with the edges of the hooks. The inwardly bent ends of the hooks of one of the holding members co-acting with the barb on the wire effectually prevents the wire working outwardly between said hooks when the same has been clamped between the members 27 by the rotation of the crank 29.

In the actual use of the device, the hook or spur upon the body bar is engaged with the trunk of a tree or a stationary fence post as shown in Fig. 1, the operating handle 9 extending laterally from said body bar. The wire to be stretched is extended through the loop 26 on the end of the bar and is tightly clamped upon the plate 24 on the lever by means of the cam member 25. The operator now grasps the end of the handle and moves the same rearwardly or toward himself, the pawl 12 serving as a fulcrum for the lever. The pawl 19 is thus also moved with the lever outwardly upon the racked face of the body bar, in which movement of said pawl the spring 22 is placed under tension or stretched, whereby said pawl is held in close contact with the teeth of the body bar as it moves over the same. The movement of the operating lever is now reversed or forced inwardly away from the operator, whereupon the pawl 19 remains stationary with respect to the body bar and serves as a fulcrum for the lever so that the pawl 12 in the end of said lever is moved upon the racked face of the bar, the spring 23 carried by the sliding yoke 14 serving to at all times hold the pawl in close engagement with the rack teeth. In this manner the lever is moved outwardly upon the body bar 5 and the fence wire is gradually stretched. When the lever reaches the limit of its outward movement, the operator engages the holding members 27 with the partially tightened wire and securely clamps the wire between said members. He now moves the cam members 25 to release the same from clamping engagement with the wire and forces the pawl 12 out of engagement with the teeth on the body bar so that the lever and pawls carried thereby can be moved inwardly upon the bar into position for the stretching operation to be continued. In this manner the wires may be very quickly and tightly stretched and stapled to the post.

It will be noted that the wires are stretched or drawn past the post to which they are to be secured so that there will be absolutely no slack in the wires after the stretcher is removed therefrom.

The device may be easily and quickly arranged in position for use or removed and requires but small expenditure of manual labor in its operation.

Owing to the comparatively few elements employed in the invention, it will be obvious that the same can be manufactured at small cost, is extremely strong and durable and highly efficient in practical use.

While I have shown and described the preferred construction and arrangement of the various elements, it will be understood that the same are susceptible of considerable modification without departing from the essential feature or sacrificing any of the advantages thereof.

Having thus described the invention what is claimed is:—

1. In a wire stretcher, a body bar provided with an anchoring hook and having a longitudinal series of rack teeth, a lever longitudinally movable on said bar, a pair of pawls fulcrumed in the end of said lever upon one side of the body bar for engagement with the teeth thereof, a yoke mounted upon one of the pawls and embracing said body bar, and a spring arranged in said yoke bearing against the pawl to retain the same in engagement with the teeth on the bar, said pawls being alternately stationary and movable in the actuation of the lever and serving as fulcrums therefor, and means for securing a fence wire to said lever.

2. In a wire stretcher, a body bar provided with an anchoring hook and having a series of rack teeth on one face, a lever having a forked end movable longitudinally on the bar, a pair of pawls pivotally mounted in the forked end of said lever and disposed upon the same side of the body bar for engagement with the teeth thereof, a yoke embracing the end of one of said pawls and the body bar, said pawl having an opening in one end, a pin carried by the yoke loosely disposed in said opening to connect the yoke to the pawl for movement therewith longitudinally with respect to the body bar, a coiled spring on said pin yieldingly holding the pawl in engagement with the rack teeth, a spring to yieldingly hold the other of the pawls in engagement with the teeth of the body bar, and means mounted on the lever to connect a fence wire thereto, said pawls being alternately stationary and movable with respect to the body bar in the actuation of the lever and serving as fulcrums for said lever.

In testimony whereof I hereunto affix my signature in the presence of two witnesses.

GEORGE F. GRIFFITH.

Witnesses:
 GEORGE GRAY,
 LOSSIE R. WHEATON.

Copies of this patent may be obtained for five cents each, by addressing the "Commissioner of Patents, Washington, D. C."